United States Patent [19]

Termini

[11] 4,304,276
[45] Dec. 8, 1981

[54] ROUTER TABLE FOR CUTTING LAMINATED PLASTICS

[76] Inventor: Armando Termini, 121 Cedar Brook Dr., Churchville, Pa. 18966

[21] Appl. No.: 190,214

[22] Filed: Sep. 24, 1980

[51] Int. Cl.³ .............................................. B27C 1/12
[52] U.S. Cl. ................................. 144/253 J; 51/102; 144/134 A; 403/80; 403/83; 409/226
[58] Field of Search .................... 83/409, 422; 51/102; 269/126; 409/218, 225, 226, 228, 229; 144/134 R, 134 A, 136 R, 253 R, 253 J; 403/80, 83, 78

[56] References Cited

U.S. PATENT DOCUMENTS

| | | | |
|---|---|---|---|
| 1,666,969 | 4/1928 | Conorer | 144/253 J |
| 2,104,158 | 1/1938 | Hedgpeth | 144/253 J |
| 2,569,613 | 10/1951 | Lehr | 144/134 A |
| 3,209,800 | 10/1965 | Leibow | 144/134 R |
| 3,352,334 | 11/1967 | Hunn | 144/134 R |
| 3,461,930 | 8/1969 | Warrick et al. | 144/134 R |

FOREIGN PATENT DOCUMENTS

| | | | |
|---|---|---|---|
| 1453270 | 4/1969 | Fed. Rep. of Germany | 144/134 A |
| 76958 | 2/1918 | Switzerland | 144/253 J |
| 205261 | 1/1968 | U.S.S.R. | 144/134 A |

*Primary Examiner*—W. D. Bray
*Attorney, Agent, or Firm*—Joseph G. Denny, III; Peter J. Patane

[57] ABSTRACT

A router for edging laminated plastics, such as Formica material, includes a table and an adjustable work guide assembly. The work guide assembly comprises a stationary guide and a movable guide. The movable guide is movable toward and away from the stationary guide to determine the extent of the cut to be made by the router bit. A further stationary guide is also provided which is mounted on the table parallel to the previously mentioned guides, whereby a second edge may be cut on the laminated plastic which is parallel to the first edge. Also, movable carrier guide means are provided to cut further edges transverse to the first two edges.

6 Claims, 11 Drawing Figures

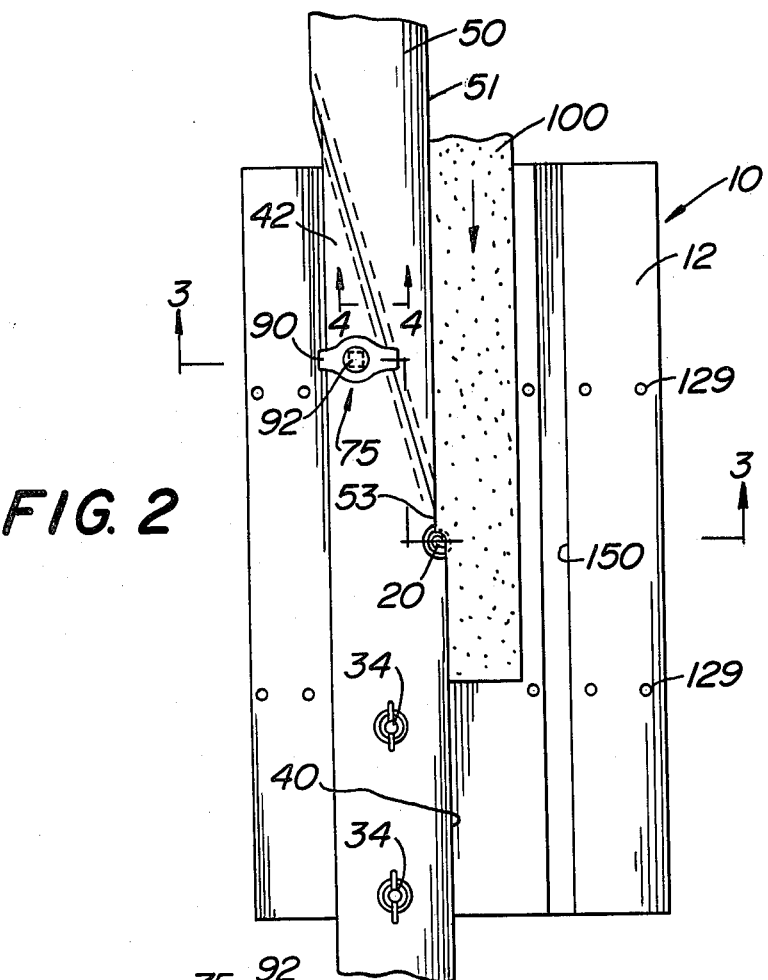
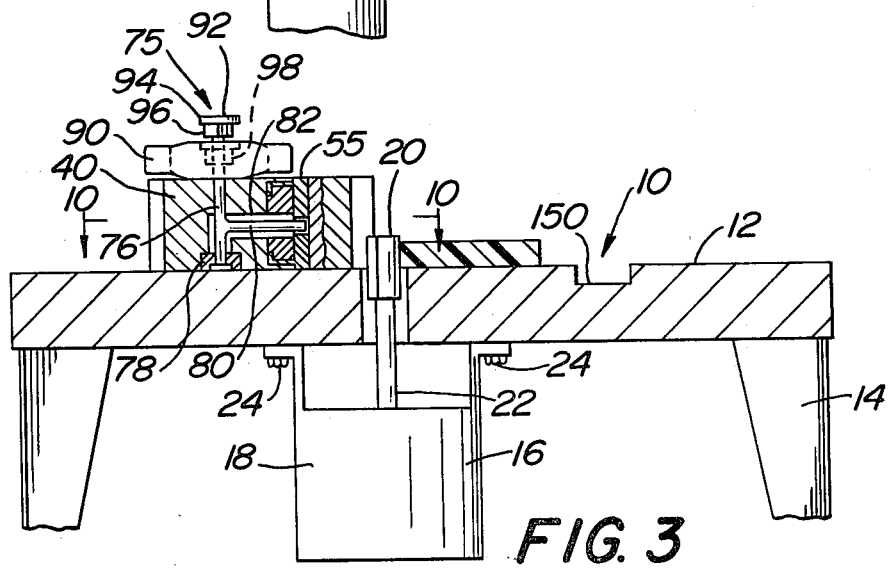
FIG. 2
FIG. 3

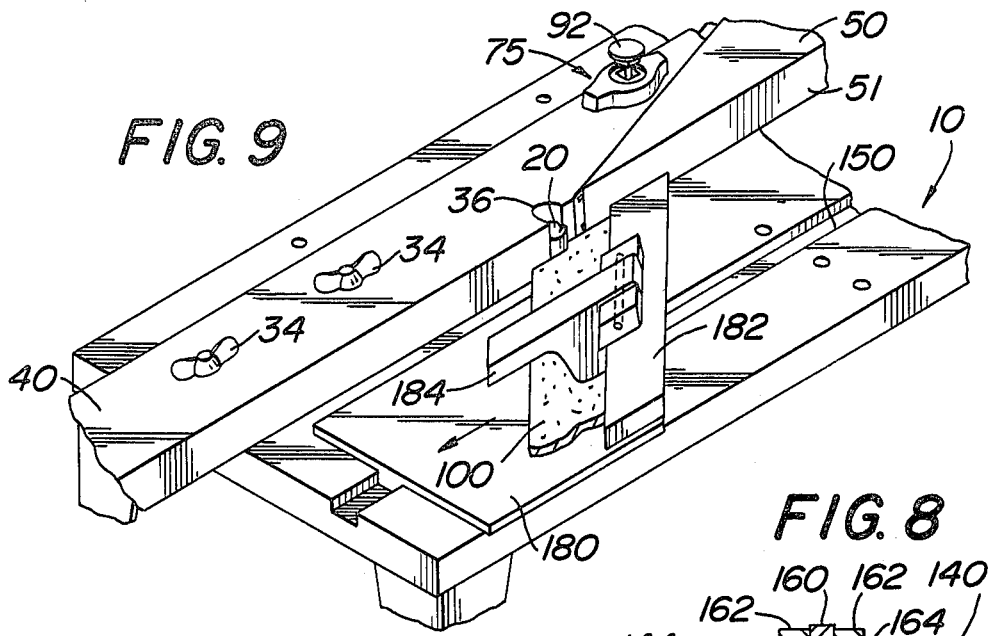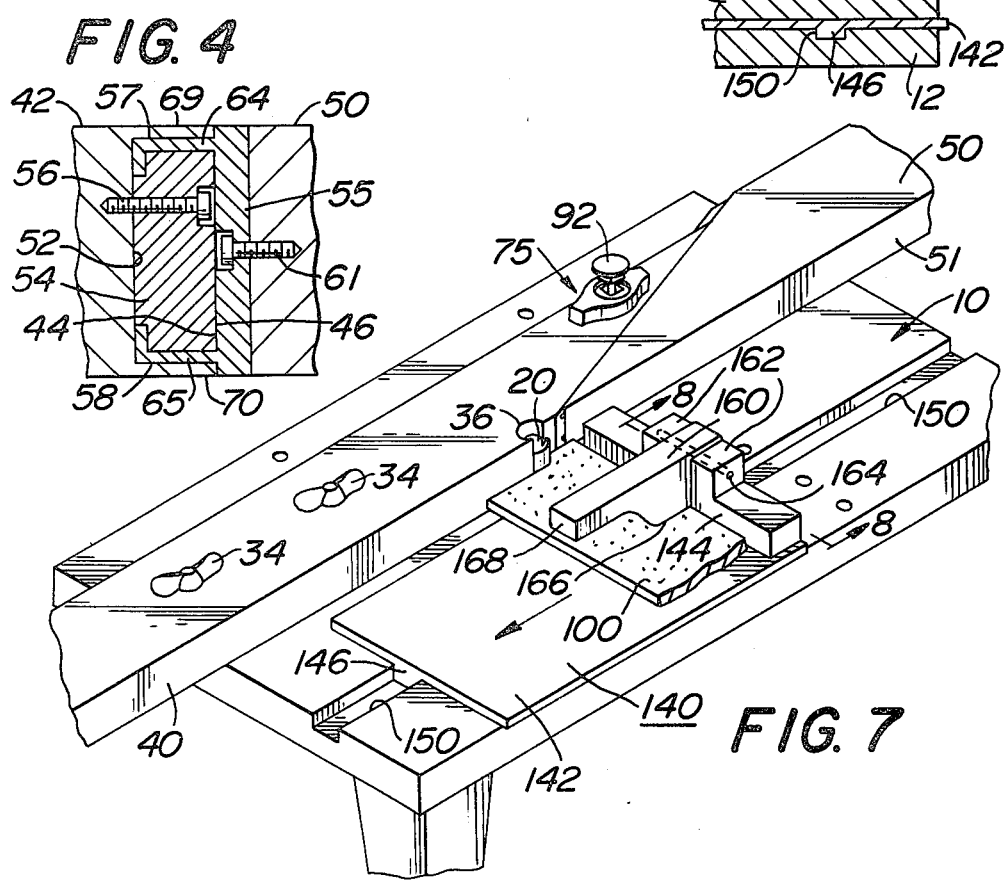

ROUTER TABLE FOR CUTTING LAMINATED PLASTICS

BACKGROUND OF THE INVENTION

The invention relates to the edging or trimming of laminated plastic sheeted material such as Formica sheets for example. Such sheets are frequently used in woodworking and are glued to the surface of wood or composition material boards in the making of cabinets, bookcases and the like. In such uses, the laminated plastic sheet must be precisely cut to fit accurately into the designated space. The fitting is often done by hand as the available router tools do not have sufficiently accurate guide means adapted to edge or trim such laminated plastic sheets.

BRIEF SUMMARY OF THE INVENTION

It is an object of this invention to provide a router table with guides for a known router wherein the guides are to be used to trim one or more edges of a piece of laminated plastic sheeted material.

The router table for edging laminated plastics, such as Formica material, is provided with an adjustable work guide assembly. The guide assembly comprises a stationary guide and a movable guide. The movable guide is movable toward and away from the stationary guide to establish the extent of the cut by the router bit. A further stationary guide is also provided which is mounted on the table and disposed parallel to the previously mentioned guides, whereby a second edge may be cut on the laminated plastic which is parallel to the first edge. Also, movable carrier guide means are provided to cut further edges transverse to the first two edges.

The foregoing and other objects of this invention, the principles of this invention, and the best modes in which I have contemplated applying such principles will more fully appear from the following description and accompanying drawings in illustration thereof.

BRIEF DESCRIPTION OF THE VIEWS

In the drawings,

FIG. 2 is a top view of the router table shown in FIG. 1 but omitting the leftmost guide shown in FIG. 1;

FIG. 3 is a cross-sectional view taken along the line 3—3 in FIG. 2;

FIG. 4 is an enlarged partial sectional view taken along the line 4—4 in FIG. 2;

FIG. 7 is a top perspective view similar to FIG. 1 but showing, in addition, a movable carrier guide;

FIG. 8 is a partial sectional view taken along the line 8—8 in FIG. 7;

FIG. 9 is a perspective view similar to FIG. 8 but showing a modified movable carrier guide;

FIG. 10 is a partial sectional view taken along the line 10—10 in FIG. 4; and

FIG. 11 is a view similar to FIG. 10 but showing a different position of the guides.

DESCRIPTION OF THE PREFERRED EMBODIMENT

Figure 1:
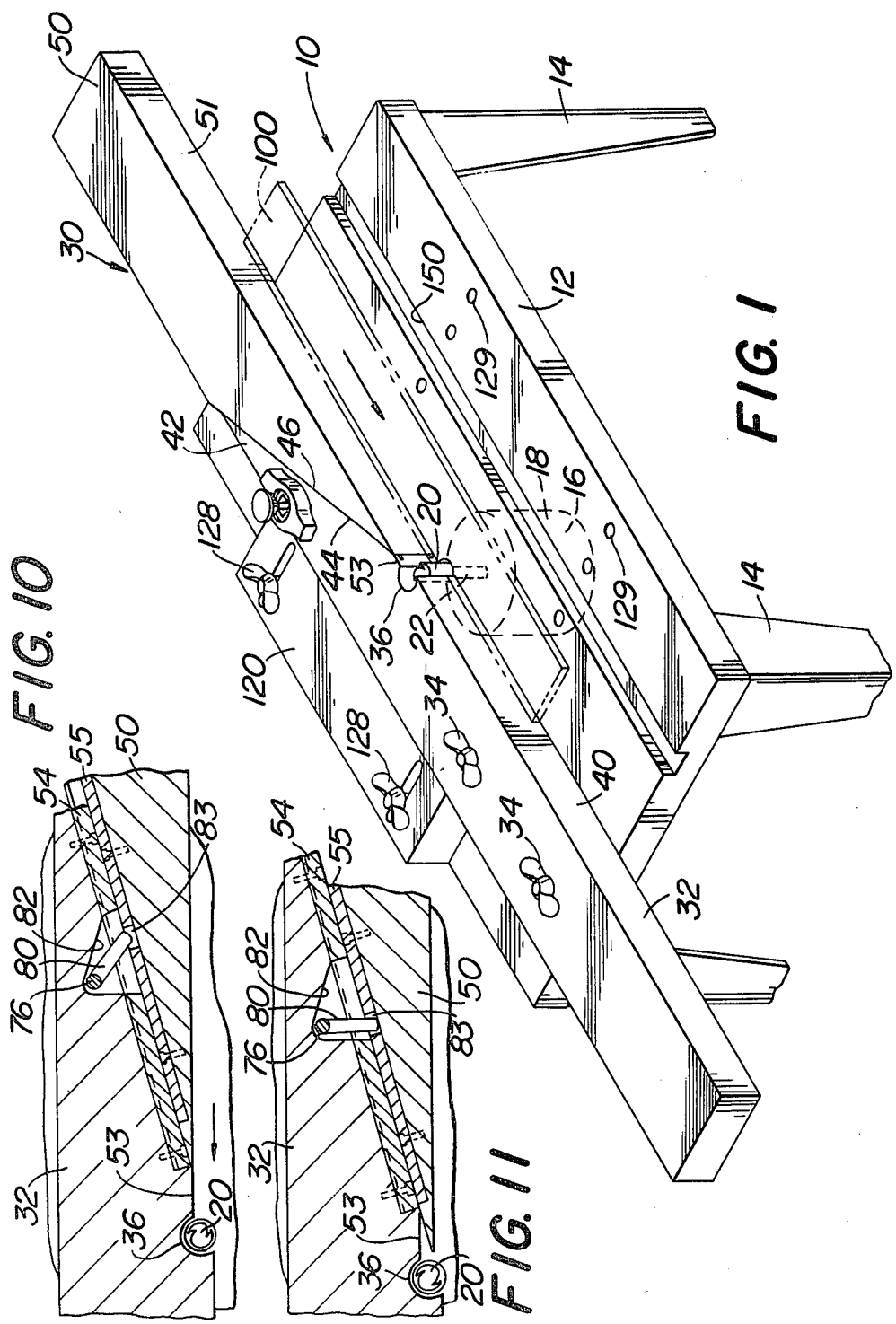
FIG. 1 is a top and side perspective view of my router table showing the guide assembly for cutting a longitudinal edge of a laminated plastic sheet.

Referring to the drawings and in particular to FIG. 1, a router table 10 is illustrated which includes my invention. The router table 10 includes a top 12 and suitable legs 14, although the legs 14 may be omitted if the top 12 is clamped or otherwise secured to a suitable support such as a work bench or the like (not shown).

Secured to the underside of the top 12 is a router assembly 16 which includes a motor 18 and a rotatable tool bit 20 secured to a shaft 22 of the motor 18 in the usual manner. The router assembly 16 is secured to the underside of the table 12 by suitable bolts 24, FIG. 3.

An adjustable work guide assembly 30 comprises a longitudinal stationary guide 32 and a longitudinal movable guide 50. The stationary guide 32 is secured to the top 12 by suitable bolts 34 preferably having wing-like heads for easy removal, the bolts 34 extending into threaded holes (not shown) in the top 12.

As seen in FIGS. 1, 2, and 3, the stationary guide 32 is provided with a semi-circular notch 36 into which is received the bit 20, but the bit 20 does not extend above the top surface of the stationary guide 32 for the sake of safety. The longitudinal straight edge surface 40 of the stationary guide 32 is aligned with the outer periphery of the tool bit 20, as best shown in FIG. 2, on one side, the left side of the bit 20 (as viewed in FIG. 1), while on the other side, the notch 36 is cut back to form a shoulder surface 53 parallel to the surface 40, but spaced therefrom as shown. The spacing between surfaces 40 and 53 determines the maximum cut of the bit 20, this maximum cut being less than the outer diameter of the bit 20.

The stationary guide 32 includes a diagonally shaped end 42 to the right of the notch 36, as viewed in FIG. 1, with a diagonal end face 44 keyed to a correspondingly shaped end face 46 of the movable guide 50.

The movable guide 50 also defines a straight edge 51 which may be moved parallel to the straight edge 40 to vary the width of cut of the router bit 20. Since the maximum width of cut is determined by the distance between the outer periphery of the tool bit 20 and the shoulder 53 of the fixed guide 32, when the straight edge 51 (of the guide 50) is moved back and forth, parallel to the straight edge 40, the amount of the work edge portion which will be exposed to the tool bit 20 is varied, FIGS. 10 and 11.

The movable guide 50 is made slidable relative to the fixed guide 32 by an interfitting connection formed by a bar 54 and an interfitting, keyed strip 55, FIG. 4.

The diagonally shaped end of the fixed guide 32 is formed with a longitudinal slot 52 within which is placed the strip 55 and is secured to the center of the slot 52 by suitable screws 56, as shown in FIG. 4, to define top and bottom open ended slots 57 and 58, each with the shape of an "L" but opposed to each other, as shown.

The movable guide 50 has a generally U-shaped strip 55 secured to the diagonally shaped end by suitable screws 61, as shown in FIG. 4. The strip 55 defines an open end channel to receive the bar 54 between upper and lower arms 64 and 65. The arms 64 and 65 have L-shapes interfitting with and keyed to the slots 57 and 58. It should be noted that the margins 69 and 70 of the guide 32 embracing the arms 64 and 65 abut with corresponding portions of the strip 55 so as to minimize the entry into the connection of particles formed when the laminated plastic sheet is cut, thereby assuring proper operation of the guide assembly.

To vary the movable guide 50 relative to the fixed guide 32 an adjusting means 75 is secured to the fixed guide 32. The adjusting means 75 includes a vertical rod 76 extending into the fixed guide 32, the lower end of the rod 76 being received in a bushing 78 secured to the guide 32. The rod 76 includes a horizontal lever 80 extending through a suitable slot 82 in the guide 32 and into a hole 83 formed in the strip 55. Thus, the rod 76 is rotatable back and forth in the slot 82 in the fixed guide 32 and as it so moves it forces the movable guide 50 to move back and forth along the bar 54, toward and away from the tool bit 20, but the movable straight edge 51 moves parallel to the stationary straight edge 40 at all times.

The rod 76 also extends through a know 90 for rotating the rod 76, FIG. 3. The rod 76 has a head 92 formed by a circular flange 94 and a square shaped shank 96 below the flange 94. The knob 90 has a recess 98 conforming to the flange 94 and the shank 96. Thus, when it is desired to rotate the rod 76, the knob 90 is raised so that the square shank 96 enters the correspondingly shaped part of the recess 98 and when the knob 90 is turned it will force the rod 76 to also turn. The overhanging flange 94 prevents the knob 90 from lifting completely off the rod 76 and the rod 76 itself is prevented from being lifted by the flared over end 99 which limits upward movement, as shown, downward movement being limited by its abutment with the table top 12. However, when the knob 90 is in the lower position, shown in FIG. 3, it may be rotated freely because the recess 98 is of larger diameter than the part of the rod below the shank 96.

The interfitting connection between the stationary guide 32 and the movable guide 50 is made sufficiently tight so that the movable guide 50 will remain in place during the usual cutting operation. However, if desired a locking means to secure the movable guide 50 in place may be provided but it is not shown.

It is seen from the foregoing that the movable guide 50 has a forward end which is wedge shaped and by virtue of the interconnection with the mating wedge shape provided on the mating stationary guide 32, the straight edge 51 is easily and conveniently movable parallel to the stationary straight edge 40.

Thus, when it is desired to cut an edge margin of a laminated plastic sheet 100 such as a Formica sheet, the movable guide 50 is adjusted for the desired cut and the sheet 100 is placed against the straight edge 51 on the table top 12 and pushed against the tool bit 20 from right to left, as viewed in FIG. 1, and as indicated by the arrow. The width of cut will be determined by the distance between the two straight edges 40 and 51. As the sheet 100 passes the tool bit 20, the newly formed edge surface rests against the stationary straight edge 40 for additional stability.

Figure 5:
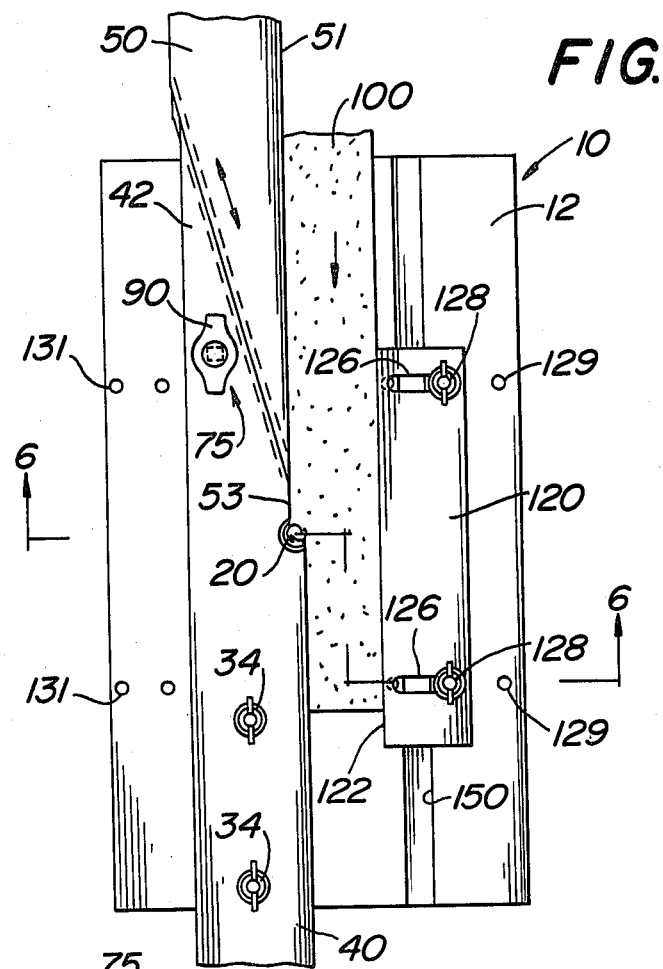
FIG. 5 is a top view similar to FIG. 2 but to which a further guide has been added.
Figure 6:
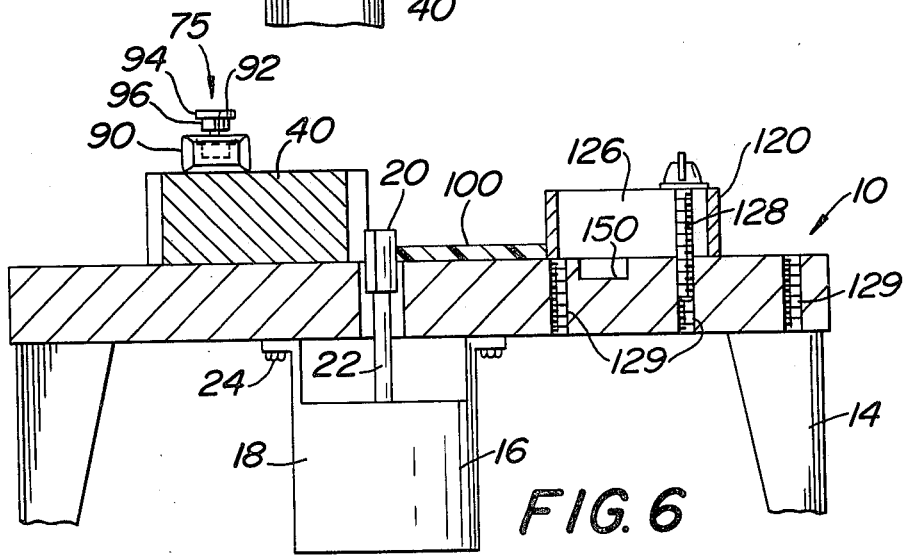
FIG. 6 is a cross-sectional view taken along the line 6—6 in FIG. 5.

After the first edge surface is cut as heretofore described, a second edge surface, parallel to the first edge surface may be cut on the work sheet 100. For this purpose a third guide 120 is placed on the table top 12, as shown in FIGS. 5 and 6, parallel with but spaced from the straight edges 40 and 51. The third guide 120 includes a straight edge 122 which is parallel with the straight edges 40 and 51, as shown. The third guide 120 has elongated slots 124 and 126 through which bolts 128 extend for securing the guide 120 to the table top 12. The elongated slots 124 and 126 permit the guide 120 to be moved toward and away from the tool bit 20, as desired. The bolts 128 are threaded into suitable holes 129 in the table top 12 and have wing-like heads to facilitate their rotation. Several sets of holes 129 are provided, as shown, so that the third guide 120 may be placed at different positions on the table top 12.

Referring to FIG. 1, when the guide 120 is not in use, it may be stored, as shown in FIG. 1, by being secured to the table top 12 by the bolts 128 which at such time extend into suitable holes 131 in the table top 12 above the fixed guide 32. The guide 120 is not shown in FIGS. 2 and 3.

Referring to FIGS. 7 and 8, a movable carrier guide 140 is illustrated for use in cutting an edge margin on the work sheet 100 perpendicular to either one of the heretofore cut longitudinal edges. (In FIG. 7 the portion of the work sheet 100 closest to the viewer has been broken away for illustrative purposes only.)

The movable carrier 140 comprises a plate 142 carrying a guide bar 144. The plate 142 has a rib 146 extending in a slot 150 in the table top 12. The slot 150 is parallel to the straight edges 40 and 51. The guide bar 144 is mounted on the plate 142 so that it is perpendicular to the rib 146 and slot 150.

A clamp 160 is pivotally connected between spaced posts 162 carried by the bar 144 by a pin 164 which extends through the posts 162 and clamp 160, as shown in FIGS. 7 and 8. The clamp 160 is rotated clockwise, as viewed in FIG. 7, to lift the clamp 160 away from the plate 142, and then the work sheet 100 is placed upon the plate 142 with the previously cut edge against the bar 144, as seen in FIG. 7. The clamp 160 is then rotated counterclockwise until the lower clamp cam surface 166 engages the work sheet 100 to hold the work sheet 100 securely in place on the plate 142 and against the bar 144. While the clamp 160 is so held manually the entire carrier guide 140 is moved from right to left, as viewed in FIG. 7, to cut the perpendicular edge margin of the work sheet 100. The cam surface 166 is cut back, as shown, to form a handle 168 for ease of operation of the clamp 160. Preferably the edge margin of the plate 142 closest the straight 40 is slightly spaced away from the straight edge 40, as shown in FIG. 7.

Referring to FIG. 9 a modified movable carrier guide 180 is shown. In the carrier guide 180 the guide bar 182 is placed at a 45° angle with the straight edges 40 and 51 so as to turn the edge of the work 100 at a 45° angle to its longitudinal edges. The clamp 184 is supported on the guide bar as described in connection with FIGS. 7 and 8 and the movable carrier guide 180 is generally similar to the movable guide 140 shown in FIGS. 7 and 8. While the bar 182 is shown at a 45° angle, it is understood that it may be placed at any desired angle.

What I claim is:

1. A work guide assembly for use in connection with cutting an edge of a laminated sheeted material on a router table, said work guide assembly comprising
   a first stationary guide,
   A second movable guide,
   said first stationary guide receiving a router tool bit,
   said guides having mating, wedge shaped ends and abutting, interfitting faces,
   said guides including straight edges,
   whereby the straight edge on said movable guide is movable back and forth relative to the straight edge on said stationary guide to vary the depth of cut by the router bit.

2. The combination of claim 1 wherein said interfitting faces have a mating U-shape with overlapping margins preventing the entry of particles between the interfitting faces.

3. The combination of claim 1 or 2 wherein
an adjustment means is provided carried by said stationary guide for moving said movable guide,
said adjustment means comprising a rotatable rod and a pivotal lever for moving said movable guide,
said lever extending into said movable guide, and
said stationary guide having a slot within which said lever pivots.

4. The combination of claims 1, 2 or 3 and a further stationary guide placed on the table spaced parallel to said first and second guides.

5. The combination of claims 1, 2 or 3 and a further movable guide placed on the table for use in connection with cutting a further edge of said laminated sheeted material which is transverse to the first cut edge.

6. The combination of claim 5 wherein said movable guide includes a platform for carrying said work,
a rib movable in a slot formed in said table parallel to said straight edges,
a bar carried by said platform,
said bar extending transverse to said rib and against which said laminated sheeted material is placed, and
clamp means for holding said laminated sheeted material upon said platform.

* * * * *